(12) United States Patent
Xia et al.

(10) Patent No.: US 9,970,826 B2
(45) Date of Patent: May 15, 2018

(54) BIPOLAR JUNCTION TRANSISTOR VOLTAGE-DROP-BASED TEMPERATURE SENSORS

(71) Applicant: QUALCOMM Incorporated, San Diego, CA (US)

(72) Inventors: William Xia, San Diego, CA (US); Kendrick Hoy Leong Yuen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 444 days.

(21) Appl. No.: 14/639,053

(22) Filed: Mar. 4, 2015

(65) Prior Publication Data

US 2016/0258819 A1 Sep. 8, 2016

(51) Int. Cl.
*G01K 7/01* (2006.01)
(52) U.S. Cl.
CPC ............... *G01K 7/015* (2013.01); *G01K 7/01* (2013.01)
(58) Field of Classification Search
CPC .................................. G01K 7/01; G01K 7/015
See application file for complete search history.

(56) References Cited

U.S. PATENT DOCUMENTS

| 4,004,462 | A | * | 1/1977 | Dobkin | ..................... G01K 7/01 |
| | | | | | 323/226 |
| 4,243,898 | A | | 1/1981 | Seelbach | |
| 5,546,041 | A | * | 8/1996 | Szajda | .................... H03F 3/082 |
| | | | | | 307/650 |
| 6,060,792 | A | | 5/2000 | Pelly | |
| 6,149,299 | A | | 11/2000 | Aslan et al. | |
| 6,995,588 | B2 | * | 2/2006 | Gee | ......................... G01K 7/01 |
| | | | | | 327/138 |

(Continued)

OTHER PUBLICATIONS

Abu-Zeid M M., et al., "Diode-bridge Temperature Sensor", Review of Scientific Instruments, AIP, Melville, NY, US, vol. 57, No. 10, Oct. 1, 1986 (Oct. 1, 1986), pp. 2609-2613, XP001412429, ISSN: 0034-6748 the whole document.

(Continued)

*Primary Examiner* — Randy Gibson
(74) *Attorney, Agent, or Firm* — Muncy, Geissler, Olds & Lowe, P.C.

(57) ABSTRACT

Temperature sensors using bipolar junction transistors are provided. Examples of the disclosed sensors minimize effects of IR drop and have improved accuracy. An example temperature sensor includes a first branch coupled between a power supply and ground. The first branch includes a first transistor series-coupled with a second transistor via a first node and has a first temperature sensor output via the first node. The temperature sensor also includes a second branch coupled between the power supply and ground. The second branch includes a third transistor series-coupled with a fourth transistor via a second node and has a second temperature sensor output via the second node. The first through fourth transistors are diode-connected and can have an n-well structure or a deep n-well structure. The temperature sensor also includes a voltage sensor having an input coupled to the first temperature sensor output and the second temperature sensor output.

38 Claims, 10 Drawing Sheets

New temperature sensor type 1 (with NPN BJTs)

New temperature sensor type 2 (with PNP BJTs)

(56) References Cited

U.S. PATENT DOCUMENTS

| | | | |
|---|---|---|---|
| 7,281,846 B2 * | 10/2007 | McLeod | G01K 7/01 327/513 |
| 7,841,770 B2 | 11/2010 | Lee et al. | |
| 8,136,987 B2 * | 3/2012 | Luria | G01K 7/01 327/512 |
| 8,217,708 B2 | 7/2012 | Yoshikawa | |
| 8,378,735 B2 | 2/2013 | Da Silva, Jr. et al. | |
| 2003/0067344 A1 * | 4/2003 | Nanba | G01K 7/24 327/513 |
| 2005/0264971 A1 * | 12/2005 | Morino | G01K 3/005 361/103 |
| 2008/0018482 A1 | 1/2008 | Chiu et al. | |
| 2014/0184311 A1 * | 7/2014 | Seshita | G01K 7/01 327/513 |
| 2015/0063419 A1 * | 3/2015 | Obayashi | G01K 7/01 374/163 |
| 2016/0116345 A1 * | 4/2016 | Furtner | G01K 7/01 374/178 |

OTHER PUBLICATIONS

International Search Report and Wirtten Opinion—PCT/US2016/017072—ISA/EPO—Apr. 12, 2016.

* cited by examiner

New temperature sensor type 2 (with PNP BJTs)

New temperature sensor type 1 (with NPN BJTs)

New temperature sensor type 3 (with PNP BJTs and without DNW)

New temperature sensor type 5 with PNP BJTs and resistors

New temperature sensor type 4 with NPN BJTs and resistors

New temperature sensor type 6 with PNP BJTs and resistors

New temperature sensor type 8 with PNP BJTs and resistors

New temperature sensor type 7 with NPN BJTs and resistors

BIPOLAR JUNCTION TRANSISTOR VOLTAGE-DROP-BASED TEMPERATURE SENSORS

INTRODUCTION

This disclosure relates generally to electronics, and more specifically, but not exclusively, to bipolar junction transistor-based temperature sensors.

Temperature sensors are ubiquitous in today's modern electronic devices. They can be used to perform protective functions, such as sensing fires and detecting processor over-temperature conditions. They can also be used as part of a closed-loop feedback system to regulate temperature, such as in heating, ventilation, and air conditioning control systems, or in an integrated circuit thermal management system. Further, temperature sensors can be used to measure a temperature of the atmosphere and to tell a user how hot or cold it is outside.

Some conventional semiconductor temperature sensors function based on temperature dependence of VBE of a bipolar junction transistor (BJT) or a forward bias voltage of a p/n junction diode. However, in conventional devices, a device mismatch, a voltage drop (e.g., IR drop), and a temperature dependence of a parasitic resistance along a path from a power supply (and/or ground) to the temperature sensor terminals affect temperature measurement results. These factors detrimentally reduce signal to noise ratio, decrease measurement resolution, decrease measurement accuracy, and reduce measurement reliability.

Accordingly, there are long-felt industry needs for methods and apparatus that improve upon the conventional methods and apparatus.

SUMMARY

This summary provides a basic understanding of some aspects of the present teachings. This summary is not exhaustive in detail, and is neither intended to identify all critical features nor intended to limit the scope of the claims.

Exemplary methods and apparatus for measuring temperature are provided. In an example, a method includes causing a first current to flow through a first transistor that is series-coupled with a second transistor via a first node to cause a first voltage drop that is a function of temperature of the first transistor and a second voltage drop that is a function of temperature of the second transistor. The method includes causing a second current that is equal in magnitude to the first current to flow through a third transistor that is series-coupled with a fourth transistor via a second node to cause a third voltage drop that is a function of temperature of the third transistor and a fourth voltage drop that is a function of temperature of the fourth transistor. The first through fourth transistors are diode-connected. The method also includes measuring a voltage difference between the first node and the second node.

In a further example, provided is a non-transitory computer-readable medium, comprising instructions stored thereon that, if executed by a processor, such as a special-purpose processor, cause the processor to execute at least a part of the aforementioned method.

In another example, provided is an apparatus configured to measure temperature. The apparatus includes means for causing a first current to flow through a first transistor that is series-coupled with a second transistor via a first node to cause a first voltage drop that is a function of temperature of the first transistor and a second voltage drop that is a function of temperature of the second transistor. The apparatus includes means for causing a second current that is equal in magnitude to the first current to flow through a third transistor that is series-coupled with a fourth transistor via a second node to cause a third voltage drop that is a function of temperature of the third transistor and a fourth voltage drop that is a function of temperature of the fourth transistor. The first through fourth transistors are diode-connected. The apparatus also includes means for measuring a voltage difference between the first node and the second node.

At least a part of the apparatus can be integrated in a semiconductor die. Further, at least a part of the apparatus can be a part of a device, such as a mobile device, a set top box, a music player, a video player, an entertainment unit, a navigation device, a communications device, a personal digital assistant, a fixed location data unit, a silicon chip, an integrated circuit, and/or a computer. In a further example, provided is a non-transitory computer-readable medium comprising lithographic device-executable instructions stored thereon that are configured to cause a lithographic device to fabricate at least a part of the apparatus.

In another example, provided is an apparatus configured to measure temperature. The apparatus includes a temperature sensor. The temperature sensor includes a first branch coupled between a power supply and ground. The first branch includes a first transistor that is series-coupled with a second transistor via a first node and has a first temperature sensor output via the first node. The temperature sensor includes a second branch coupled between the power supply and ground. The second branch includes a third transistor that is series-coupled with a fourth transistor via a second node and has a second temperature sensor output via the second node. The first through fourth transistors are diode-connected. The apparatus also includes a voltage sensor having an input coupled to the first temperature sensor output and the second temperature sensor output.

At least a part of the apparatus can be integrated in a semiconductor die. Further, at least a part of the apparatus can be a part of a device, such as a mobile device, a set top box, a music player, a video player, an entertainment unit, a navigation device, a communications device, a personal digital assistant, a fixed location data unit, a silicon chip, an integrated circuit, and/or a computer. In a further example, provided is a non-transitory computer-readable medium comprising lithographic device-executable instructions stored thereon that are configured to cause a lithographic device to fabricate at least a part of the apparatus.

The foregoing broadly outlines some of the features and technical advantages of the present teachings in order that the detailed description and drawings can be better understood. Additional features and advantages are also described in the detailed description. The conception and disclosed examples can be readily utilized as a basis for modifying or designing other structures for carrying out the same purposes of the present teachings. Such equivalent constructions do not depart from the technology of the teachings as set forth in the claims. The inventive features that are characteristic of the teachings, together with further objects and advantages, are better understood from the detailed description and the accompanying figures. Each of the figures is provided for the purpose of illustration and description only, and does not limit the present teachings.

BRIEF DESCRIPTION OF THE DRAWINGS

The accompanying drawings are presented to describe examples of the present teachings, and are not limiting.

FIG. 11 depicts an exemplary temperature sensor.

Figure 1A:
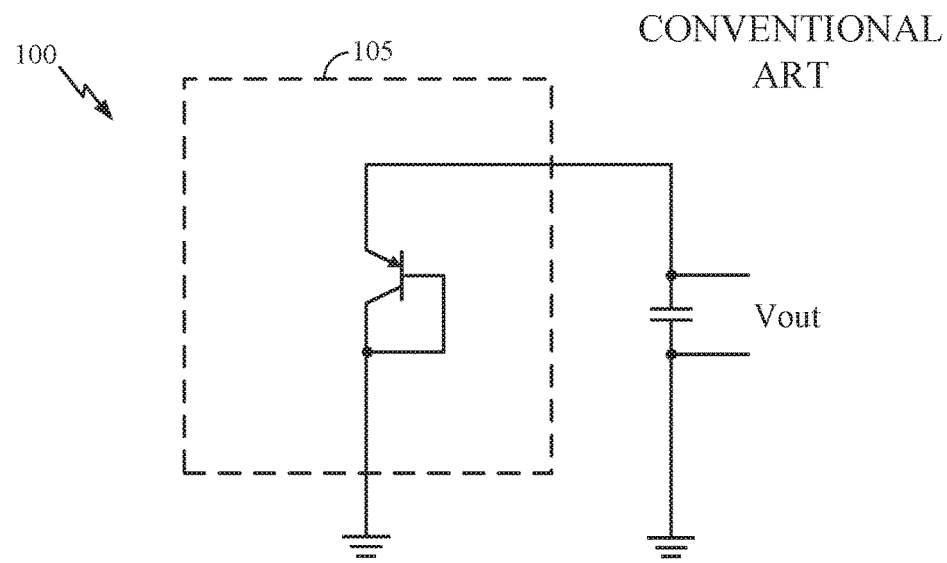
FIG. 1A depicts an exemplary Bipolar Junction Transistor (BJT) temperature sensor.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Introduction

Improved temperature sensors using bipolar junction transistors are provided. In examples, the temperature sensors have a symmetric bridge-like design including bipolar junction transistors (BJTs) that can have an n-well or a deep n-well isolation structure. These new temperature sensors can be used in applications including monitoring in-situ temperature distribution in a silicon chip.

The temperature sensor disclosed herein advantageously address the long-felt industry needs, as well as other previously unidentified needs, and mitigate shortcomings of the conventional methods and apparatus. For example, advantages provided by the disclosed apparatuses and methods include an improvement in signal to noise ratio, an improvement in measurement resolution, an improvement in measurement accuracy, an improvement in measurement reliability over conventional devices, or a combination thereof.

Examples are disclosed in this application's text and drawings. Alternate examples can be devised without departing from the scope of the invention. Additionally, conventional elements of the current teachings may not be described in detail, or may be omitted, to avoid obscuring aspects of the current teachings. As used herein, the term "exemplary" means "serving as an example, instance, or illustration." Any example described as "exemplary" is not necessarily to be construed as preferred or advantageous over other examples. Likewise, the term "examples of the invention" does not require that all examples of the invention include the discussed feature, advantage, or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

It should be noted that the terms "connected," "coupled," and any variant thereof, mean any connection or coupling between elements, either direct or indirect, and can encompass a presence of an intermediate element between two elements that are "connected" or "coupled" together via the intermediate element. Coupling and connection between the elements can be physical, logical, or a combination thereof. Elements can be "connected" or "coupled" together, for example, by using one or more wires, cables, printed electrical connections, electromagnetic energy, and the like. The electromagnetic energy can have a wavelength at a radio frequency, a microwave frequency, a visible optical frequency, an invisible optical frequency, and the like. These are several non-limiting and non-exhaustive examples.

The term "signal" can include any signal such as a data signal, an audio signal, a video signal, a multimedia signal, an analog signal, a digital signal, and the like. Information can be represented using any of a variety of different technologies and techniques. For example, data, an instruction, a process step, a command, information, a signal, a bit, a symbol, and the like can be represented by a voltage, a current, an electromagnetic wave, a magnetic field, a magnetic particle, an optical field, and optical particle, and any combination thereof.

A reference using a designation such as "first," "second," and so forth does not limit either the quantity or the order of those elements. Rather, these designations are used as a convenient method of distinguishing between two or more elements. Thus, a reference to first and second elements does not mean that only two elements can be employed, or that the first element must necessarily precede the second element. Also, unless stated otherwise, a set of elements can comprise one or more elements. In addition, terminology of the form "at least one of: A, B, or C" used in the description or the claims can be interpreted as "A or B or C or any combination of these elements." For example, this terminology may include A, or B, or C, or A and B, or A and C, or A and B and C, or 2A, or 2B, or 2C, and so on.

The terminology used herein is for the purpose of describing particular examples only and is not intended to be limiting. As used herein, the singular forms "a," "an," and "the" include the plural forms as well, unless the context clearly indicates otherwise. Further, the terms "comprises," "comprising," "includes," and "including," specify a presence of a feature, an integer, a step, an operation, an element, a component, and the like, but do not necessarily preclude a presence or an addition of another feature, integer, step, operation, element, component, and the like.

The provided apparatuses can be a part of, and/or coupled to, an electronic device such as, but not limited to, at least one of a mobile device, a navigation device (e.g., a global positioning system receiver), a wireless device, a camera, an audio player, a camcorder, or a game console.

The term "mobile device" can describe, and is not limited to, at least one of a mobile phone, a mobile communication device, a mobile hand-held computer, a portable computer, a tablet computer, a wireless device, a wireless modem, other types of portable electronic devices typically carried by a person and having electro-magnetic communication capabilities, a tablet computer, or any other electronic device that is person-portable. Further, the terms "user equipment" (UE), "mobile terminal," "user device," "mobile device," and "wireless device" can describe the same device.

DESCRIPTION OF THE FIGURES

FIG. 1A depicts an exemplary Bipolar Junction Transistor (BJT) temperature sensor 100. The BJT temperature sensor 100 includes a BJT 105 that is diode-connected, that is, the base of BJT 105 is coupled to the collector of BJT 105. The diode-connection configures the BJT 105 into a temperature sensor by causing changes in voltage drops across the BJT 105 to depend upon temperature changes of the BJT 105. For example, base-emitter voltage ($V_{BE}$) of the BJT 105 can be determined as follows:

$$V_{BE} = V_{G0}\left(1 - \frac{T}{T_0}\right) + V_{BE0}\left(\frac{T}{T_0}\right) + \left(\frac{nKT}{q}\right)\ln\left(\frac{T_0}{T}\right) + \left(\frac{KT}{q}\right)\ln\left(\frac{I_c}{I_{C0}}\right) \quad \text{Equation One}$$

Where, in Equation One:
$V_{BE}$=base-emitter voltage
$V_{G0}$=extrapolated energy band gap voltage at absolute zero
T=absolute temperature (in Kelvin)
$T_0$=reference temperature (in Kelvin)
$V_{BE0}$=base-emitter voltage at $T_0$ and $I_{C0}$
n=slope factor
K=Boltzmann's constant
q=charge of an electron
$I_c$=collector current at temperature T
$I_{C0}$=reverse saturation current at temperature $T_0$
Thus, absolute temperature can be measured by measuring and comparing band gap voltages at two different currents ($I_{C1}$ and $I_{C2}$), after eliminating some variables in Equation One:

$$\Delta V_{BE} = \left(\frac{KT}{q}\right)\ln\left(\frac{I_{C1}}{I_{C2}}\right) \quad \text{Equation Two}$$

Where, in Equation Two:
$\Delta V_{BE} = V_{BE1} - V_{BE2}$=difference in base-emitter voltage
$V_{BE1}$=base-emitter voltage with collector current $I_{C1}$
$V_{BE2}$=base-emitter voltage with collector current $I_{C2}$
$I_{C1}$=first collector current
$I_{C2}$=second collector current
Therefore, temperature T can be obtained by measuring $\Delta V_{BE}$:

$$T = \frac{q}{K}\Delta V_{BB}/\ln\left(\frac{I_{C1}}{I_{C2}}\right)$$

In general, as temperature of the BJT 105 goes up, more electrons in the BJT 105 go to the conduction band and $V_{BE}$ goes up. Though the BJT 105 is depicted in FIG. 1A as a PNP transistor, the BJT 105 can alternatively be an NPN transistor.

Figure 1B:
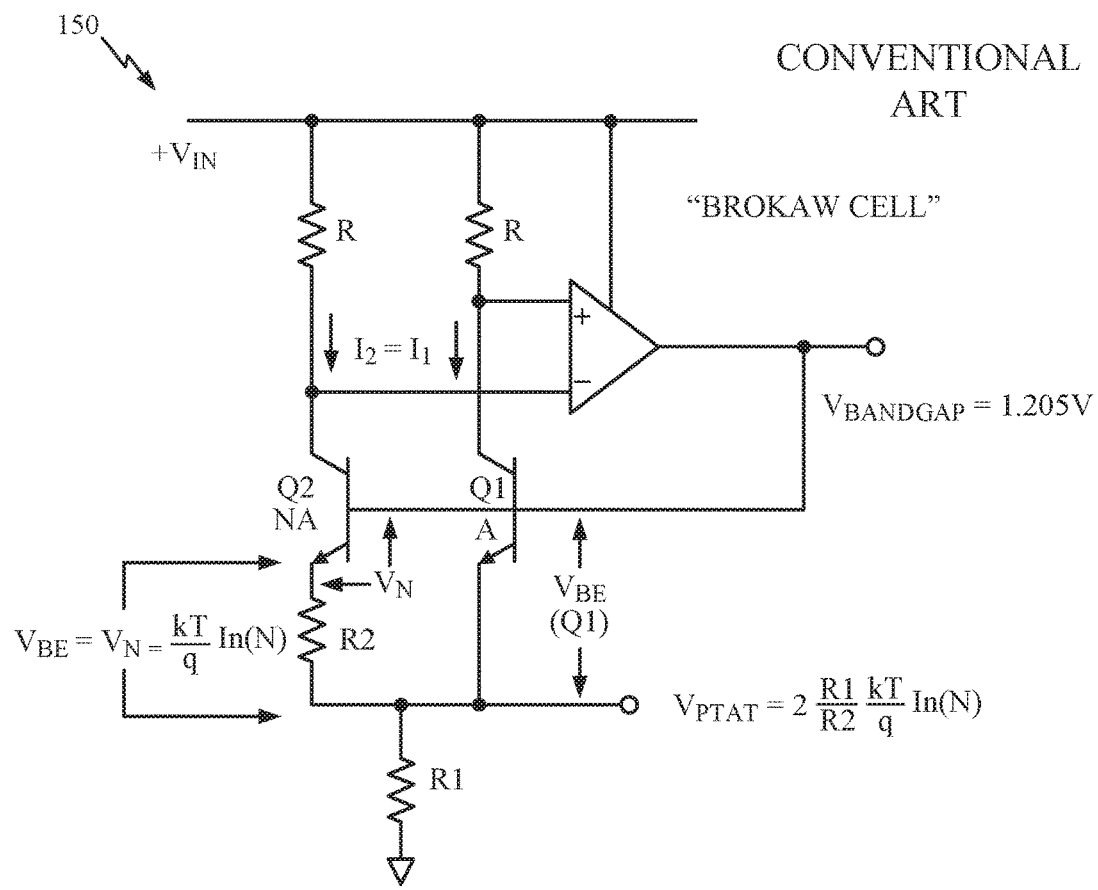
FIG. 1B depicts a Brokaw Cell.

FIG. 1B depicts a Brokaw Cell 150, which is a voltage reference circuit that can also be used as a temperature sensor. The Brokaw Cell 150 senses temperature with a pair of transistors (Q1, Q2) that have different emitter areas.

The Brokaw Cell 150 functions as follows. A single power supply provides two identical currents ($I_1$, $I_2$) through a pair of respective fixed resistors (R). A differential amplifier compares the voltages at the respective collectors of transistor Q1 and transistor Q2 and feeds back a voltage to the transistors bases that forces two identical currents ($I_1$, $I_2$) flow respectively through the emitter of transistor Q1 and the emitter of transistor Q2. The respective base-emitter voltages (i.e., the voltage drop) across transistor Q1 and transistor Q2 are temperature dependent, as described in Equation One. The respective base-emitter voltages (i.e., the voltage drop) across transistor Q1 and transistor Q2 are also dissimilar, as the emitter areas of transistor Q1 and transistor Q2 are different. Transistor Q2's emitter current flows through fixed resistor R2, while transistor Q1's emitter current does not flow through fixed resistor R2. Transistor Q2's emitter current and transistor Q1's emitter current combine and flow through fixed resistor R1. The voltage across R1, $V_{PTAT}$, is proportional to absolute temperature (PTAT). The $V_{BE}$ of Q1 is complementary to absolute temperature (CTAT). The voltage at the base of Q1, $V_{BANDGAP}$, is the sum of $V_{PTAT}$ (PTAT) and $V_{BE}$ of Q1 (CTAT) and is constant over temperature.

The Brokaw Cell 150 outputs a proportional to absolute temperature (PTAT) measurement in a form of a voltage ($V_{PTAT}$) according to Equation Three:

$$V_{PTAT} = \frac{2R1(V_{BE} - V_N)}{R2} = 2\left(\frac{R1}{R2}\right)\left(\frac{kT}{q}\right)\ln(N) \quad \text{Equation Three}$$

Where, in Equation Three:
$V_{PTAT}$=voltage across R1 that is proportional to absolute temperature
R1=resistance of resistor R1 (See FIG. 1B)
R2=resistance of resistor R2
$V_{BE}$=base-emitter voltage (in the case of FIG. 1B, the voltage across Q1's base-emitter)
$V_n$=base-emitter voltage (in the case of FIG. 1B, the voltage across Q2's base-emitter)
T=absolute temperature (in Kelvin)
k=Boltzmann's constant
q=charge of an electron
N=emitter-to-area ratio (i.e., N:1) of Q1 and Q2
The respective $V_{BE}$ for each of Q1 and Q1 has a negative temperature coefficient. However, due to the configuration of the Brokaw Cell 150, the $\Delta V_{BE}$ [$= V_{BE} - V_n = V_{PTAT} * R2/(2*R1)$] has a positive temperature coefficient.

Figure 2:
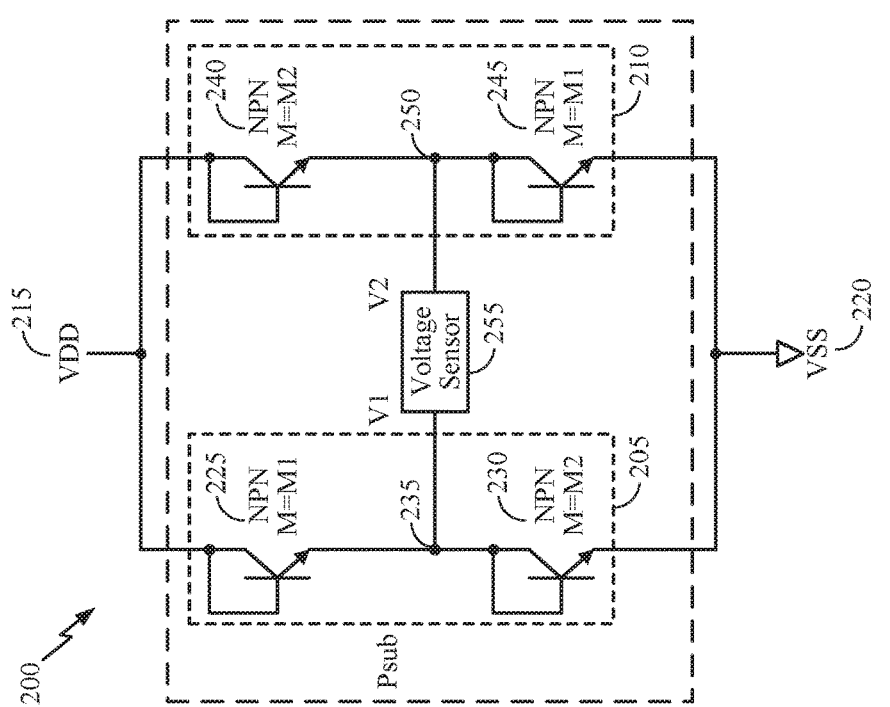

FIG. 2 depicts an exemplary temperature sensor 200. The temperature sensor 200 has NPN BJTs configured in a bridge having a first branch 205 and a second branch 210. The first branch 205 and the second branch 210 are coupled between a first power supply (VDD) 215 and a second power supply (VSS) 220 (e.g., ground). The first branch 205 includes a first diode-connected NPN BJT 225 in series with a second diode-connected NPN BJT 230 via first node 235. The first node 235 is a first temperature sensor output. The second branch 210 includes a third diode-connected NPN BJT 240 in series with a fourth diode-connected NPN BJT 245 via second node 250. The second node 250 is a second temperature sensor output.

In an example, the first diode-connected NPN BJT 225 in FIG. 2 represents a first number "M1" of diode-connected NPN transistors that is coupled in parallel. Also, the fourth diode-connected NPN BJT 245 represents the same number "M1" of diode-connected NPN transistors that is coupled in parallel. Using a multiple number "M1" of diode-coupled transistors coupled in parallel increases temperature sensor sensitivity by increasing the effect of a temperature change on the combined total change in $V_{BE}$ across the entirety of the parallel-coupled transistors.

In another example, the second diode-connected NPN BJT 230 in FIG. 2 represents a second number "M2" of diode-connected NPN transistors that is coupled in parallel. Also, the third diode-connected NPN BJT 240 represents the same number "M2" of diode-connected NPN transistors that is coupled in parallel. Using a multiple number "M2" of diode-coupled transistors coupled in parallel increases temperature sensor sensitivity by increasing the effect of a temperature change on the combined total change in $V_{BE}$ across the entirety of the parallel-coupled transistors.

A voltage sensor 255 has an input coupled to the first node 235 and the second node 250. The voltage sensor 255 can include a look-up table and is configured to convert a difference in voltage between the first node 235 and the second node 250 to data indicating a temperature of the temperature sensor 200.

During operation, currents having substantially-equivalent magnitudes flow through the first branch 205 and the second branch 210. As described with reference to FIG. 1A, the respective $V_{BE}$ for each of the first diode-connected NPN BJT 225, the second diode-connected NPN BJT 230, the third diode-connected NPN BJT 240, and the fourth diode-connected NPN BJT 245 varies with temperature. The temperature-dependent voltage measured by the voltage sensor 255 between the first node 235 and the second node 250 is proportional to absolute temperature of the devices and is according to Equation Four:

$$V_{PTAT} = V_{BEQ2} - V_{BEQ4} = \frac{kT}{q}\ln\left(\frac{M1}{M2}\right) \quad \text{Equation Four}$$

Where, in Equation Four:
Voltage=voltage measured by the voltage sensor 255
$V_{BEQ2}=V_{BE}$ of the second diode-connected NPN BJT 230 at the specific absolute temperature=voltage at node 235
$V_{BEQ4}=V_{BE}$ of the fourth diode-connected NPN BJT 245 at the specific absolute temperature=voltage at node 250

Figure 3:
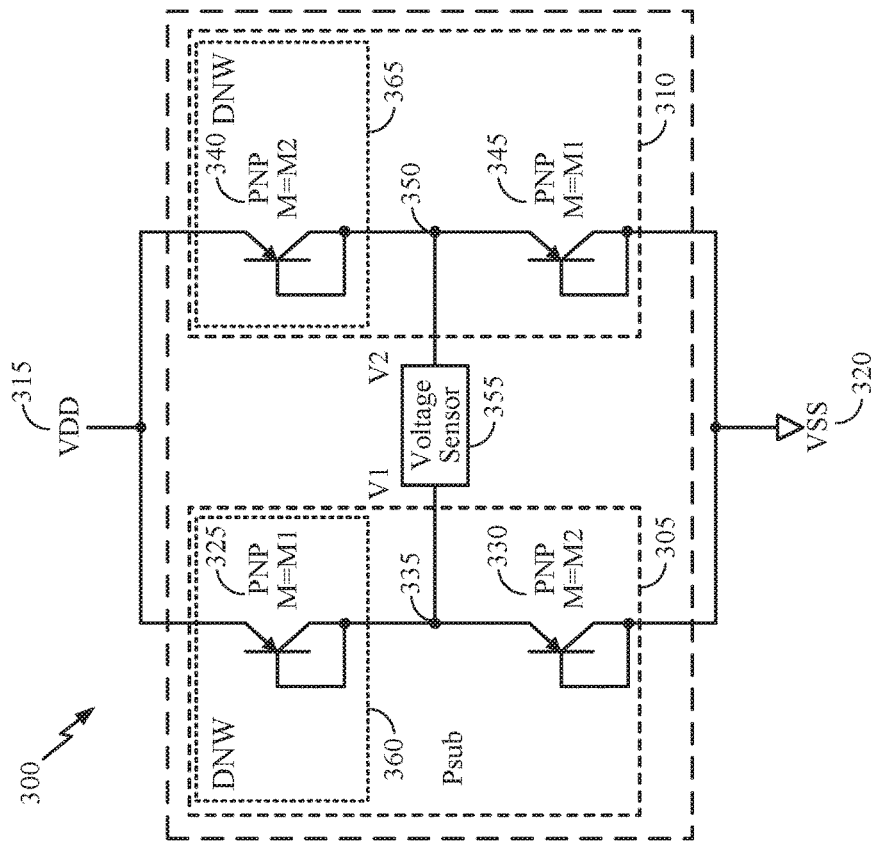
FIGS. 2-7 depict different exemplary temperature sensors.

FIG. 3 depicts an exemplary temperature sensor 300. The temperature sensor 300 has PNP BJTs configured in a bridge having a first branch 305 and a second branch 310. The first branch 305 and the second branch 310 are coupled between a first power supply (VDD) 315 and a second power supply (VSS) 320 (e.g., ground). The first branch 305 includes a first diode-connected PNP BJT 325 in series with a second diode-connected PNP BJT 330 via first node 335. The first node 335 is a first temperature sensor output. The second branch 310 includes a third diode-connected PNP BJT 340 in series with a fourth diode-connected PNP BJT 345 via second node 350. The second node 350 is a second temperature sensor output.

In an example, the first diode-connected PNP BJT 325 in FIG. 3 represents a first number "M1" of diode-connected PNP transistors that is coupled in parallel. Also, the fourth diode-connected PNP BJT 345 represents the same number "M1" of diode-connected PNP transistors that is coupled in parallel. Using a multiple number "M1" of diode-coupled transistors coupled in parallel increases temperature sensor sensitivity by increasing the effect of a temperature change on the combined total change in $V_{BE}$ across the entirety of the parallel-coupled transistors.

In another example, the second diode-connected PNP BJT 330 in FIG. 3 represents a second number "M2" of diode-connected PNP transistors that is coupled in parallel. Also, the third diode-connected PNP BJT 340 represents the same number "M2" of diode-connected PNP transistors that is coupled in parallel. Using a multiple number "M2" of diode-coupled transistors coupled in parallel increases temperature sensor sensitivity by increasing the effect of a temperature change on the combined total change in $V_{BE}$ across the entirety of the parallel-coupled transistors.

A voltage sensor 355 has an input coupled to the first node 335 and the second node 350. The voltage sensor 355 can include a look-up table and is configured to convert a difference in voltage between the first node 335 and the second node 350 to data indicating a temperature of the temperature sensor 300.

In an example, at least one of the first diode-connected PNP BJT 325, the second diode-connected PNP BJT 330, the third diode-connected PNP BJT 340, or the fourth diode-connected PNP BJT 345 can have an n-well isolation structure (e.g., 360, 365). The n-well isolation structure is at least a part of an isolation region that isolates a collector of a respective transistor to minimize leakage current through a substrate on which the transistor is formed. In an example, the n-well isolation structure is a deep n-well isolation structure (DNW). Using a deep n-well structure improves sensor accuracy by reducing leakage current.

During operation, currents having substantially-equivalent magnitudes flow through the first branch 305 and the second branch 310. As described with reference to FIG. 1A, the respective $V_{BE}$ for each of the first diode-connected PNP BJT 325, the second diode-connected PNP BJT 330, the third diode-connected PNP BJT 340, and the fourth diode-connected PNP BJT 345 varies with temperature. The temperature-dependent voltage measured by the voltage sensor 355 between the first node 335 and the second node 350 is proportional to absolute temperature of the devices and is according to Equation Five:

$$V_{PTAT} = V_{BEQ2} - V_{BEQ4} = \frac{kT}{q}\ln\left(\frac{M1}{M2}\right) \quad \text{Equation Five}$$

Where, in Equation Five:
Voltage=voltage measured by the voltage sensor 355
$V_{BEQ2}=V_{BE}$ of the second diode-connected PNP BJT 330 at the specific absolute temperature=voltage at node 335
$V_{BEQ4}=V_{BE}$ of the fourth diode-connected PNP BJT 345 at the specific absolute temperature=voltage at node 350

Figure 4:
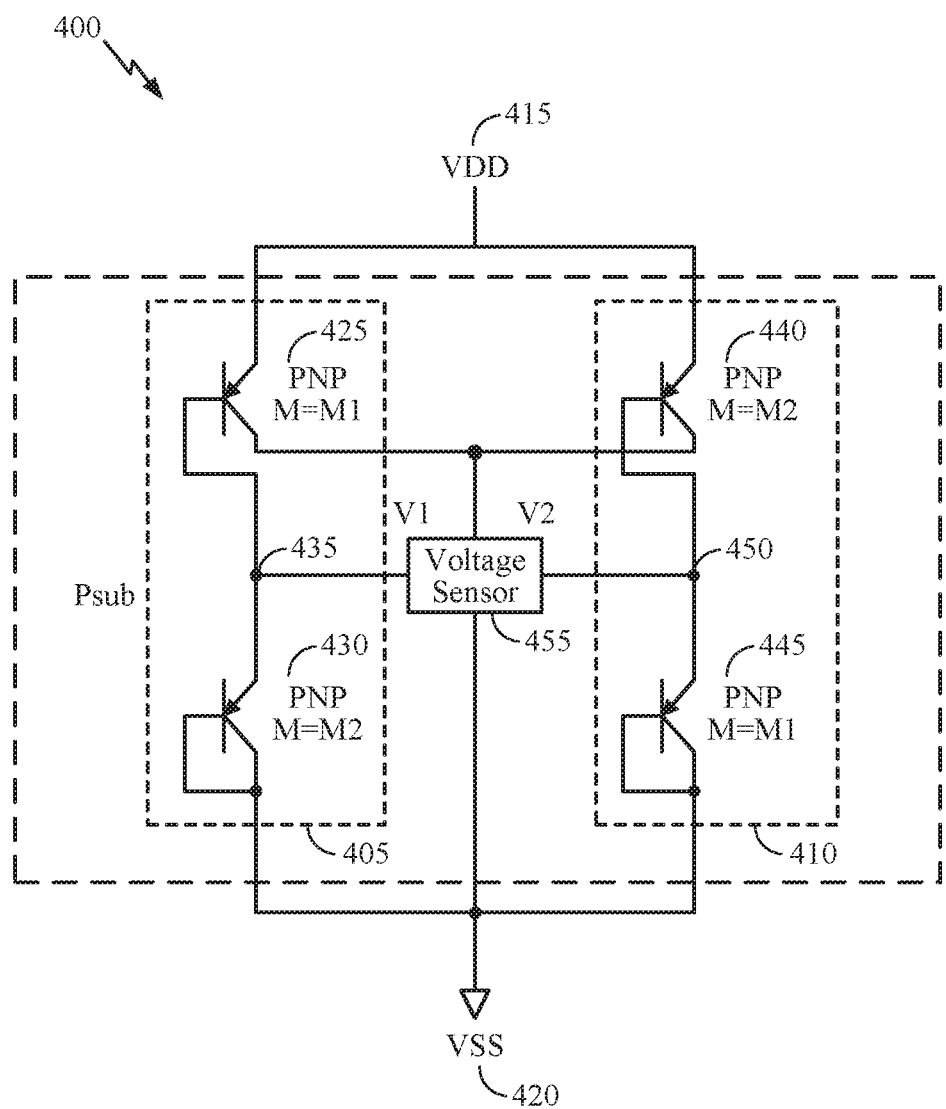

FIG. 4 depicts an exemplary temperature sensor 400. The temperature sensor 400 has PNP BJTs configured in a first branch 405 and a second branch 410, and can be used when a fabrication process does not support n-well fabrication. The first branch 405 and the second branch 410 are coupled between a first power supply (VDD) 415 and a second power supply (VSS) 420 (e.g., ground). The first branch 405 includes a first PNP BJT 425 and a second diode-connected PNP BJT 430 via first node 435. The first node 435 is a first temperature sensor output. The second branch 410 includes a third PNP BJT 440 in series with a fourth diode-connected PNP BJT 445 via second node 450. The second node 450 is a second temperature sensor output.

In an example, the first PNP BJT 425 in FIG. 4 represents a first number "M1" of diode-connected PNP transistors that is coupled in parallel. Also, the fourth diode-connected PNP BJT 445 represents the same number "M1" of diode-connected PNP transistors that is coupled in parallel. Using a multiple number "M1" of diode-coupled transistors coupled in parallel increases temperature sensor sensitivity by increasing the effect of a temperature change on the combined total change in $V_{BE}$ across the entirety of the parallel-coupled transistors.

In another example, the second diode-connected PNP BJT 430 in FIG. 4 represents a second number "M2" of diode-connected PNP transistors that is coupled in parallel. Also, the third PNP BJT 440 represents the same number "M2" of diode-connected PNP transistors that is coupled in parallel. Using a multiple number "M2" of diode-coupled transistors coupled in parallel increases temperature sensor sensitivity by increasing the effect of a temperature change on the combined total change in $V_{BE}$ across the entirety of the parallel-coupled transistors.

A voltage sensor 455 has an input coupled to the first node 435 and the second node 450. The voltage sensor 455 can include a look-up table and is configured to convert a difference in voltage between the first node 435 and the second node 450 to data indicating a temperature of the temperature sensor 400.

During operation, currents having substantially-equivalent magnitudes flow through the first branch 405 and the second branch 410. As described with reference to FIG. 1A, the respective $V_{BE}$ for each of the second diode-connected PNP BJT 430 and the fourth diode-connected PNP BJT 445 varies with temperature. The voltage measured by the voltage sensor 455 between the first node 435 and the second node 450 provides an output indicative of the temperature of the second diode-connected PNP BJT 430 and the fourth diode-connected PNP BJT 445.

Figures 5, 6:
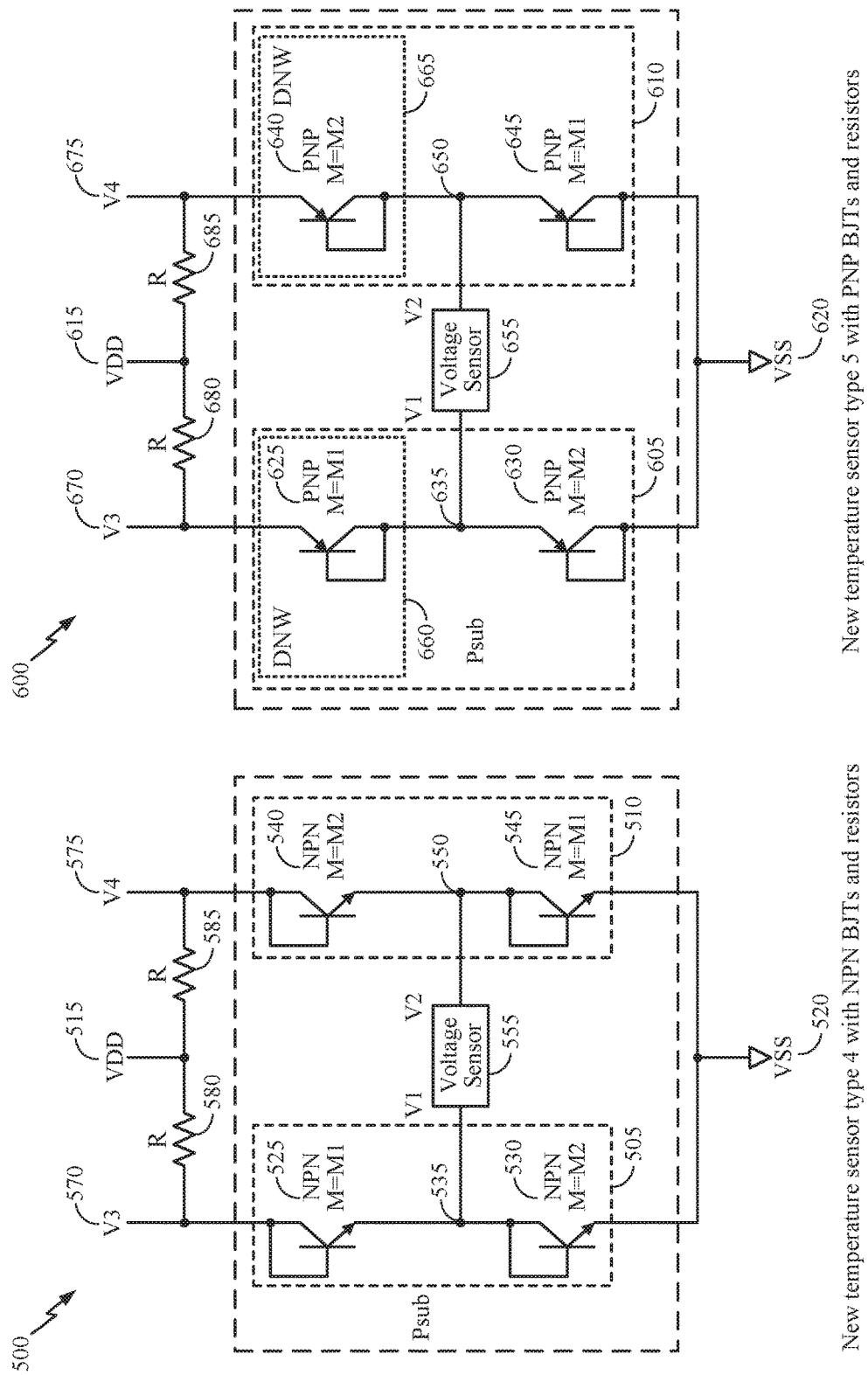

FIG. 5 depicts an exemplary temperature sensor 500. The temperature sensor 500 has NPN BJTs configured in a bridge having a first branch 505 and a second branch 510. The first branch 505 and the second branch 510 are coupled between a first power supply (VDD) 515 and a second power supply (VSS) 520 (e.g., ground). The first branch 505 includes a first diode-connected NPN BJT 525 in series with a second diode-connected NPN BJT 530 via first node 535. The first node 535 is a first temperature sensor output. The second branch 510 includes a third diode-connected NPN BJT 540 in series with a fourth diode-connected NPN BJT 545 via second node 550. The second node 550 is a second temperature sensor output.

In an example, the first diode-connected NPN BJT 525 in FIG. 5 represents a first number "M1" of diode-connected NPN transistors that is coupled in parallel. Also, the fourth diode-connected NPN BJT 545 represents the same number "M1" of diode-connected NPN transistors that is coupled in parallel. Using a multiple number "M1" of diode-coupled transistors coupled in parallel increases temperature sensor sensitivity by increasing the effect of a temperature change on the combined total change in $V_{BE}$ across the entirety of the parallel-coupled transistors.

In another example, the second diode-connected NPN BJT 530 in FIG. 5 represents a second number "M2" of diode-connected NPN transistors that is coupled in parallel. Also, the third diode-connected NPN BJT 540 represents the same number "M2" of diode-connected NPN transistors that is coupled in parallel. Using a multiple number "M2" of diode-coupled transistors coupled in parallel increases temperature sensor sensitivity by increasing the effect of a temperature change on the combined total change in $V_{BE}$ across the entirety of the parallel-coupled transistors.

A voltage sensor 555 has an input coupled to the first node 535 and the second node 550. The voltage sensor 555 can include a look-up table and is configured to convert a difference in voltage between the first node 535 and the second node 550 to data indicating a temperature of the temperature sensor 500.

The temperature sensor 500 also has a third power supply (V3) 570, a fourth power supply (V4) 575, a first resistor 580, and a second resistor 585 in a current-divider configuration.

During operation, the resistors can be used to measure the currents that flow through each of the first branch 505 and the second branch 510 to verify the circuit is operating correctly. Thus, currents having substantially-equivalent magnitudes flow through the first branch 505 and the second branch 510. As described with reference to FIG. 5, the respective $V_{BE}$ for each of the first diode-connected NPN BJT 525, the second diode-connected NPN BJT 530, the third diode-connected NPN BJT 540, and the fourth diode-connected NPN BJT 545 varies with temperature. The temperature-dependent voltage measured by the voltage sensor 555 between the first node 535 and the second node 550 is proportional to absolute temperature of the devices and is according to Equation Six:

$$V_{PTAT} = V_{BEQ2} - V_{BEQ4} = \frac{kT}{q}\ln\left(\frac{M1}{M2}\right) \qquad \text{Equation Six}$$

Where, in Equation Six:
Voltage=voltage measured by the voltage sensor 555
$V_{BEQ2}$=$V_{BE}$ of the second diode-connected NPN BJT 530 at the specific absolute temperature
$V_{BEQ4}$=$V_{BE}$ of the fourth diode-connected NPN BJT 545 at the specific absolute temperature FIG. 6 depicts an exemplary temperature sensor 600. The temperature sensor 600 has PNP BJTs configured in a bridge having a first branch 605 and a second branch 610. The first branch 605 and the second branch 610 are coupled between a first power supply (VDD) 615 and a second power supply (VSS) 620 (e.g., ground). The first branch 605 includes a first diode-connected PNP BJT 625 in series with a second diode-connected PNP BJT 630 via first node 635. The first node 635 is a first temperature sensor output. The second branch 610 includes a third diode-connected PNP BJT 640 in series with a fourth diode-connected PNP BJT 645 via second node 650. The second node 650 is a second temperature sensor output.

In an example, the first diode-connected PNP BJT 625 in FIG. 6 represents a first number "M1" of diode-connected PNP transistors that is coupled in parallel. Also, the fourth diode-connected PNP BJT 645 represents the same number "M1" of diode-connected PNP transistors that is coupled in parallel. Using a multiple number "M1" of diode-coupled transistors coupled in parallel increases temperature sensor sensitivity by increasing the effect of a temperature change on the combined total change in $V_{BE}$ across the entirety of the parallel-coupled transistors.

In another example, the second diode-connected PNP BJT 630 in FIG. 6 represents a second number "M2" of diode-connected PNP transistors that is coupled in parallel. Also, the third diode-connected PNP BJT 640 represents the same number "M2" of diode-connected PNP transistors that is coupled in parallel. Using a multiple number "M2" of diode-coupled transistors coupled in parallel increases temperature sensor sensitivity by increasing the effect of a temperature change on the combined total change in $V_{BE}$ across the entirety of the parallel-coupled transistors.

A voltage sensor 655 has an input coupled to the first node 635 and the second node 650. The voltage sensor 655 can include a look-up table and is configured to convert a difference in voltage between the first node 635 and the second node 650 to data indicating a temperature of the temperature sensor 600.

In an example, at least one of the first diode-connected PNP BJT 625, the second diode-connected PNP BJT 630, the third diode-connected PNP BJT 640, or the fourth diode-connected PNP BJT 645 can have an n-well isolation structure (e.g., 660, 665). The n-well isolation structure is at least a part of an isolation region that isolates a collector of a respective transistor to minimize leakage current through a substrate on which the transistor is formed. In an example, the n-well isolation structure is a deep n-well isolation structure (DNW). Using a deep n-well structure improves sensor accuracy by reducing leakage current.

The temperature sensor 600 also has a third power supply (V3) 670, a fourth power supply (V4) 675, a first resistor 680, and a second resistor 685 in a current-divider configuration.

During operation, the resistors can be used to measure the currents that flow through each of the first branch 605 and the second branch 610 to verify the circuit is operating correctly. Thus, currents having substantially-equivalent magnitudes flow through the first branch 605 and the second branch 610. As described with reference to FIG. 6, the respective $V_{BE}$ for each of the first diode-connected PNP BJT 625, the second diode-connected PNP BJT 630, the third diode-connected PNP BJT 640, and the fourth diode-connected PNP BJT 645 varies with temperature. The temperature-dependent voltage measured by the voltage sensor 655 between the first node 635 and the second node 650 is proportional to absolute temperature of the devices and is according to Equation Seven:

$$V_{PTAT} = V_{BEQ2} - V_{BEQ4} = \frac{kT}{q}\ln\left(\frac{M1}{M2}\right) \qquad \text{Equation Seven}$$

Figure 7:
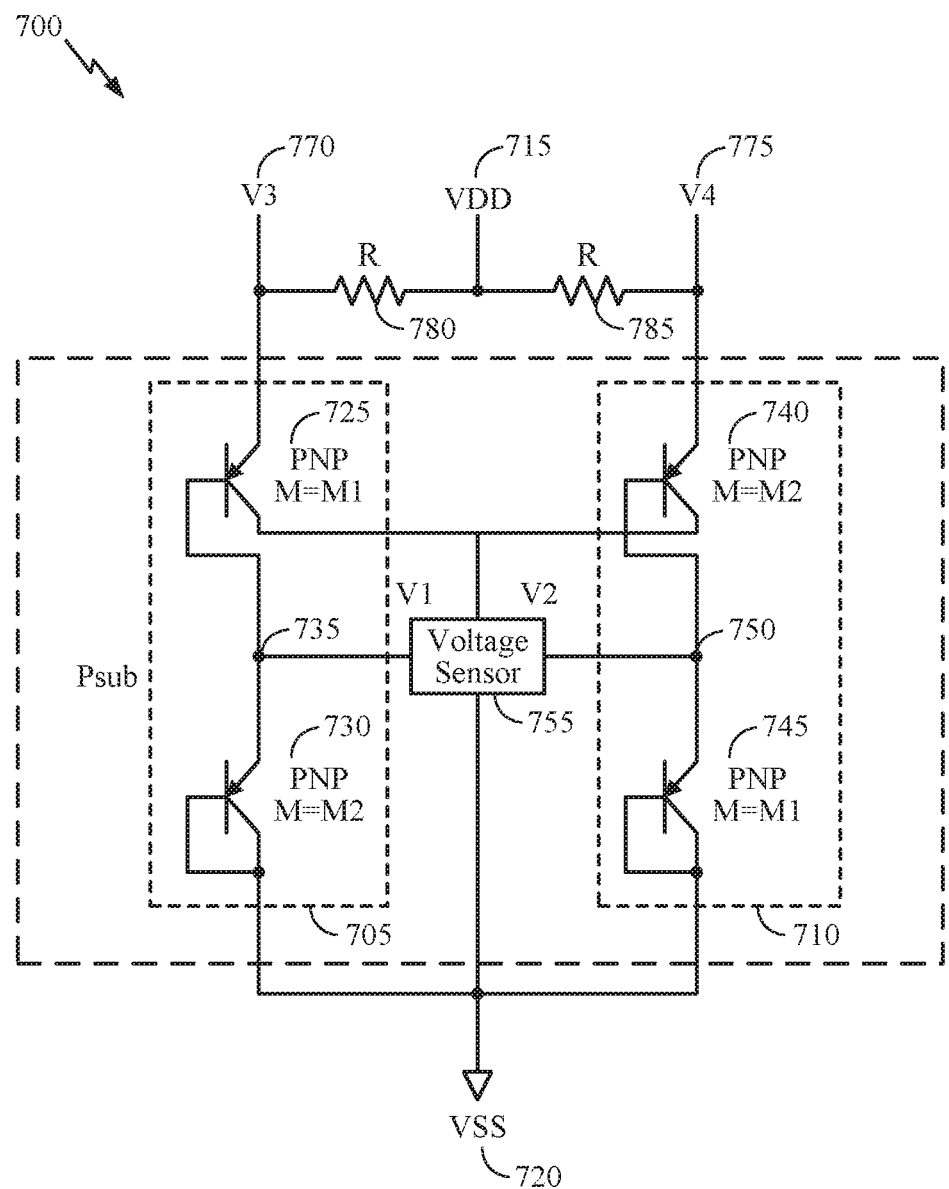

Where, in Equation Seven:
Voltage=voltage measured by the voltage sensor 655
$V_{BEQ2}=V_{BE}$ of the second diode-connected PNP BJT 630 at the specific absolute temperature
$V_{BEQ4}=V_{BE}$ of the fourth diode-connected PNP BJT 645 at the specific absolute temperature FIG. 7 depicts an exemplary temperature sensor 700. The temperature sensor 700 has PNP BJTs configured in a first branch 705 and a second branch 710, and can be used when a fabrication process does not support n-well fabrication. The first branch 705 and the second branch 710 are coupled between a first power supply (VDD) 715 and a second power supply (VSS) 720 (e.g., ground). The first branch 705 includes a first PNP BJT 725 and a second diode-connected PNP BJT 730 via first node 735. The first node 735 is a first temperature sensor output. The second branch 710 includes a third PNP BJT 740 in series with a fourth diode-connected PNP BJT 745 via second node 750. The second node 750 is a second temperature sensor output.

In an example, the first PNP BJT 725 in FIG. 7 represents a first number "M1" of diode-connected PNP transistors that is coupled in parallel. Also, the fourth diode-connected PNP BJT 745 represents the same number "M1" of diode-connected PNP transistors that is coupled in parallel. Using a multiple number "M1" of diode-coupled transistors coupled in parallel increases temperature sensor sensitivity by increasing the effect of a temperature change on the combined total change in $V_{BE}$ across the entirety of the parallel-coupled transistors.

In another example, the second diode-connected PNP BJT 730 in FIG. 7 represents a second number "M2" of diode-connected PNP transistors that is coupled in parallel. Also, the third PNP BJT 740 represents the same number "M2" of diode-connected PNP transistors that is coupled in parallel. Using a multiple number "M2" of diode-coupled transistors coupled in parallel increases temperature sensor sensitivity by increasing the effect of a temperature change on the combined total change in $V_{BE}$ across the entirety of the parallel-coupled transistors.

A voltage sensor 755 has an input coupled to the first node 735 and the second node 750. The voltage sensor 755 can include a look-up table and is configured to convert a difference in voltage between the first node 735 and the second node 750 to data indicating a temperature of the temperature sensor 700.

The temperature sensor 700 also has a third power supply (V3) 770, a fourth power supply (V4) 775, a first resistor 780, and a second resistor 785 in a current-divider configuration.

During operation, the resistors can be used to measure the currents that flow through each of the first branch 705 and the second branch 710 to verify the circuit is operating correctly. Thus, currents having substantially-equivalent magnitudes flow through the first branch 705 and the second branch 710. As described with reference to FIG. 7, the respective $V_{BE}$ for each of the second diode-connected PNP BJT 730 and the fourth diode-connected PNP BJT 745 varies with temperature. The voltage measured by the voltage sensor 755 between the first node 735 and the second node 750 provides an output indicative of the temperature of the second diode-connected PNP BJT 730 and the fourth diode-connected PNP BJT 745.

Figure 8:
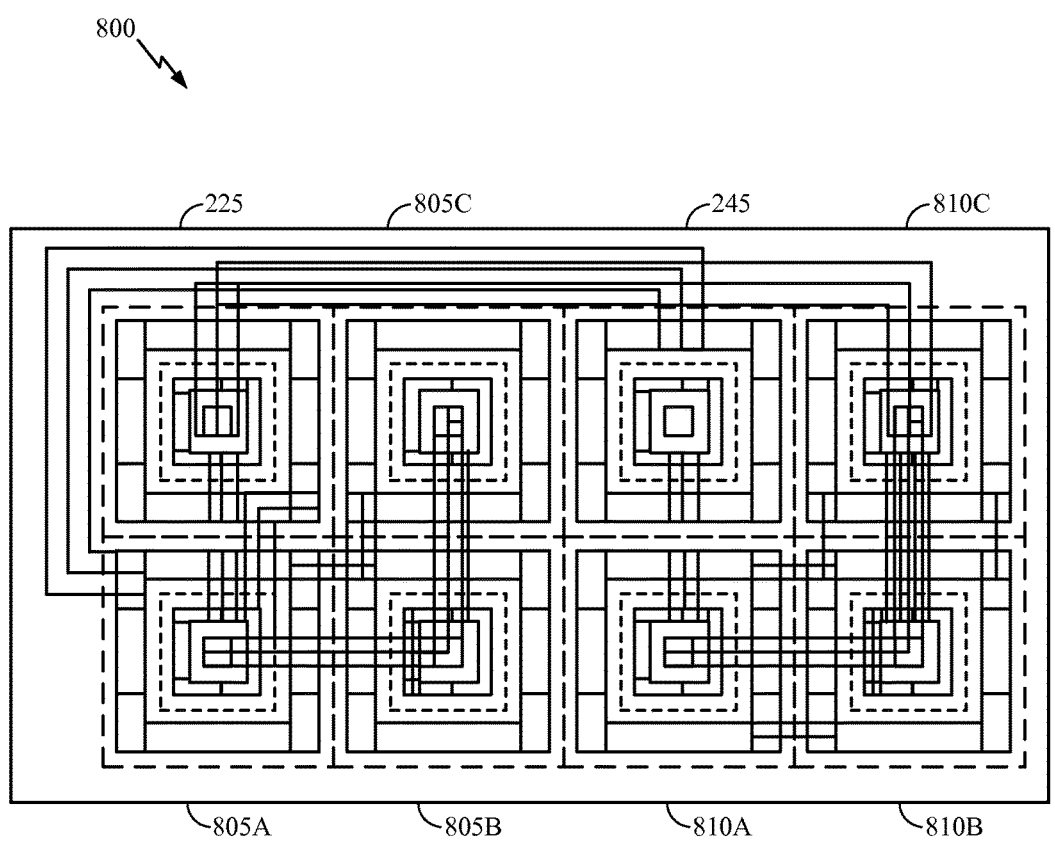
FIG. 8 depicts an exemplary layout view of the temperature sensor depicted in FIG. 2.

FIG. 8 depicts an exemplary layout view 800 of the temperature sensor 200, where the first branch 205 is depicted in the left half of the layout view 800, and the second branch 210 is depicted in the right half of the layout view 800. The first diode-connected NPN BJT 225 is depicted in the upper left of the layout view 800 and the fourth diode-connected NPN BJT 245 is depicted as the transistor in the upper row, second from the right side of the layout view 800. The second diode-connected NPN BJT 230 is depicted in the layout view 800 as a first group of "M2"=3 parallel-coupled and diode-connected transistors (805A-805C). The first group is depicted in the layout view 800 as the bottom two transistors in the left half of FIG. 8, as well as the transistor in the upper row, second from the left. The third diode-connected NPN BJT 240 is depicted in the layout view 800 as a second group of "M2"=3 parallel-coupled and diode-connected transistors (810A-810C). The second group is depicted in the layout view 800 as the bottom two transistors in the right half of FIG. 8, as well as the transistor in the upper right corner.

Figure 9:
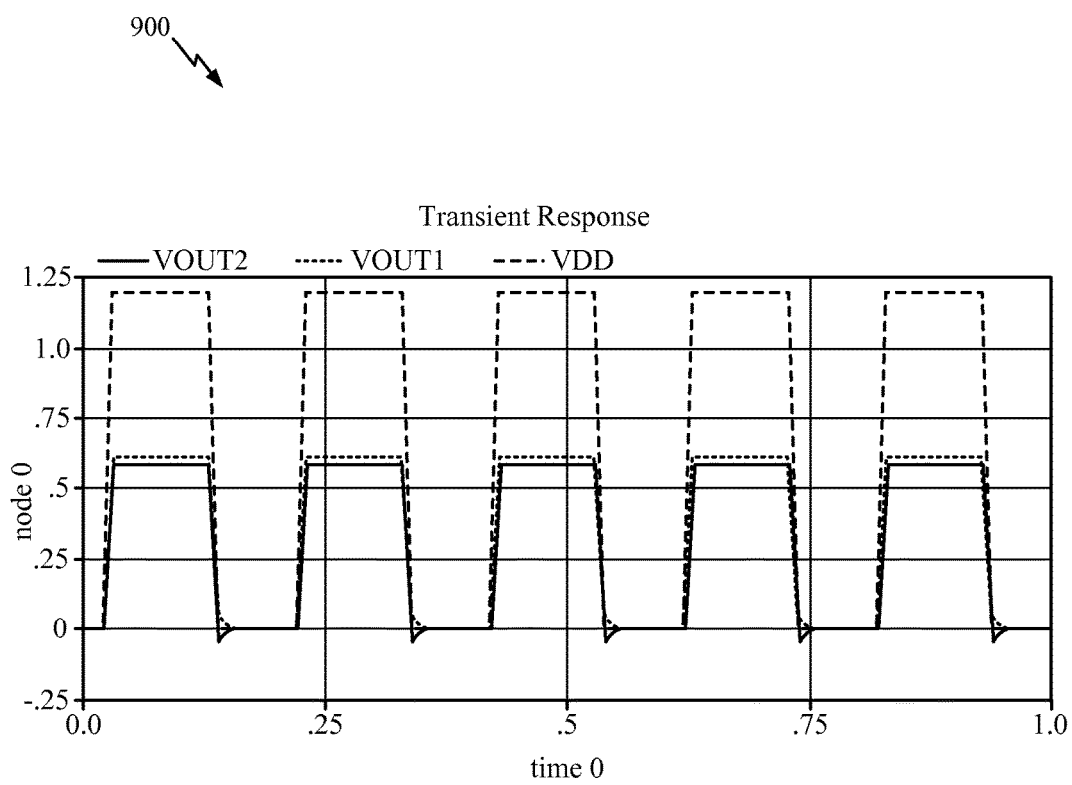
FIG. 9 depicts exemplary temperature sensor results.

FIG. 9 depicts exemplary temperature sensor results 900. The results 900 depict that an example sensor, such as that depicted in FIG. 8 and described with reference to FIG. 2, can detect temperature-induced changes in $V_{BE}$ as small as 0.03 volts.

Figure 10:
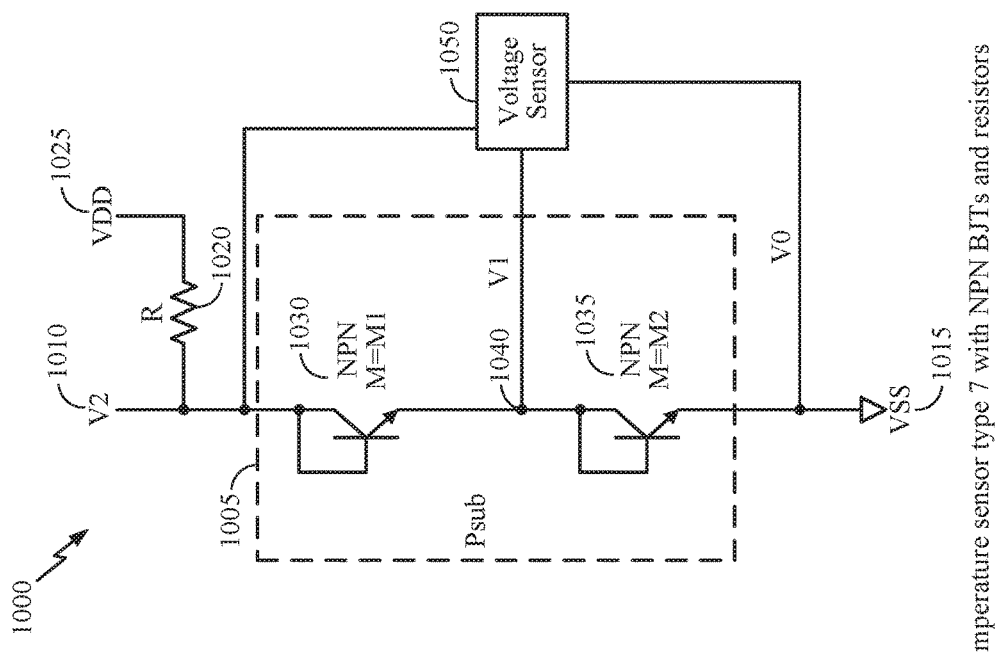

FIG. 10 depicts an exemplary temperature sensor 1000. The temperature sensor 1000 has a voltage-divider configuration including a single branch 1005 coupled between a first power supply (V2) 1010 and a second power supply ($V_{SS}$) 1015 (e.g., ground). The temperature sensor 1000 also has a current-regulating resistor 1020 coupled between a third power supply ($V_{DD}$) 1025 and the first power supply (V2) 1010.

The single branch 1005 includes a first diode-connected NPN BJT 1030 in series with a second diode-connected NPN BJT 1035 via node 1040. The node 1040 is a first temperature sensor output (V1). The first power supply (V2) 1010 is a second temperature sensor output.

A voltage sensor 1050 has an input coupled to the node 1040, the first power supply (V2) 1010, and the second power supply ($V_{SS}$) 1015. The voltage sensor 1050 can include a look-up table and is configured to convert a difference in voltages (e.g., a difference between $V_{BEQ1}$ and $V_{BEQ2}$) to data indicating a temperature of the temperature sensor 1000. In an example, the voltage sensor 1050 is configured to use these voltage measurements as inputs when performing a calculation according to Equation Eight and/or Equation Nine below.

In an example, the first diode-connected NPN BJT 1030 in FIG. 10 represents a first number "M1" of diode-connected NPN transistors that is coupled in parallel. Using a multiple number "M1" of diode-coupled transistors coupled in parallel increases temperature sensor sensitivity by increasing the effect of a temperature change on the combined total change in $V_{BE}$ across the entirety of the parallel-coupled transistors.

In another example, the second diode-connected NPN BJT 1035 in FIG. 10 represents a second number "M2" of diode-connected NPN transistors that is coupled in parallel. Using a multiple number "M2" of diode-coupled transistors coupled in parallel increases temperature sensor sensitivity by increasing the effect of a temperature change on the combined total change in $V_{BE}$ across the entirety of the parallel-coupled transistors.

During operation, a current flows through the single branch 1005. As described with reference to FIG. 10, the respective $V_{BE}$ for each of the first diode-connected NPN BJT 1030 and the second diode-connected NPN BJT 1035 varies with temperature. The temperature-dependent voltage measured by the voltage sensor 1050 between the node 1040 and the second power supply ($V_{SS}$) 1015 is according to Equation Eight:

$$\text{Voltage} = V_{BEQ1} - V_{BEQ2} = \frac{kT}{q}\ln\left(\frac{M1}{M2}\right) \quad \text{Equation Eight}$$

Where, in Equation Eight:
Voltage=voltage measured by the voltage sensor 1050
$V_{BEQ1}=V_{BE}$ of the first diode-connected NPN BJT 1030 at a specific absolute temperature
$V_{BEQ2}=V_{BE}$ of the second diode-connected NPN BJT 1035 at the specific absolute temperature
Further, $\Delta V_{BE}=V_{BEQ1}-V_{BEQ2}$ can be determined by Equation Nine:

$$\Delta V_{BE} = \left(\frac{KT}{Q}\right) * \ln\left(\frac{I_{C1}}{I_{C2}}\right) \quad \text{Equation Nine}$$

Where, in Equation Nine:

$$\left(\frac{I_{C1}}{I_{C2}}\right) = (M1/M2)$$

$$\Delta V_{BE} = 2V1 - V2 - V0$$

$$\text{Total Current} = \frac{Vdd - V2}{R} = M1 * I_{C1} = M2 * I_{C2}$$

$I_{C1}$=the total current through the first diode-connected NPN BJT 1030 divided by the multiplier M1
$I_{C2}$=the total current through the second diode-connected NPN BJT 1035 divided by the multiplier M2
$I_{C1}$ and $I_{C2}$ are unit currents through a single transistor without a multiplier.

Figure 11:
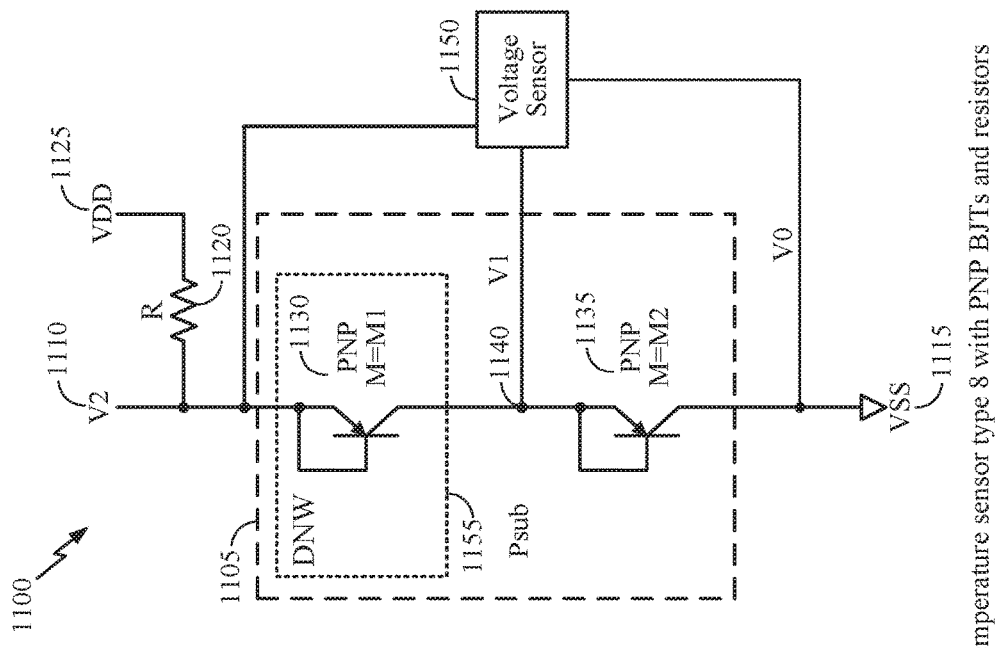
FIGS. 10-11 depict different exemplary temperature sensors.

FIG. 11 depicts an exemplary temperature sensor 1100. The temperature sensor 1100 has a voltage-divider configuration including a single branch 1105 coupled between a first power supply (V2) 1110 and a second power supply ($V_{SS}$) 1115 (e.g., ground). The temperature sensor 1100 also has a current-regulating resistor 1120 coupled between a third power supply ($V_{DD}$) 1125 and the first power supply (V2) 1110.

The single branch 1105 includes a first diode-connected PNP BJT 1130 in series with a second diode-connected PNP BJT 1135 via node 1140. The node 1140 is a first temperature sensor output (V1). The second power supply ($V_{SS}$) 1115 (e.g., ground) is a second temperature sensor output (V0) 1145.

A voltage sensor 1150 has an input coupled to the node 1140, the first power supply (V2) 1110, and the second power supply ($V_{SS}$) 1115. The voltage sensor 1150 can include a look-up table and is configured to convert a difference in voltages (e.g., a difference between $V_{BEQ1}$ and $V_{BEQ2}$) to data indicating a temperature of the temperature sensor 1100. In an example, the voltage sensor 1150 is configured to use these voltage measurements as inputs when performing a calculation according to Equation Ten and/or Equation Eleven below.

In an example, the first diode-connected PNP BJT 1130 in FIG. 11 represents a first number "M1" of diode-connected PNP transistors that is coupled in parallel. Using a multiple number "M1" of diode-coupled transistors coupled in parallel increases temperature sensor sensitivity by increasing the effect of a temperature change on the combined total change in $V_{BE}$ across the entirety of the parallel-coupled transistors.

In another example, the second diode-connected PNP BJT 1135 in FIG. 11 represents a second number "M2" of diode-connected PNP transistors that is coupled in parallel. Using a multiple number "M2" of diode-coupled transistors coupled in parallel increases temperature sensor sensitivity by increasing the effect of a temperature change on the combined total change in $V_{BE}$ across the entirety of the parallel-coupled transistors.

In an example, at least one of the first diode-connected PNP BJT 1130 and the second diode-connected PNP BJT 1135 can have an n-well isolation structure 1155. The n-well isolation structure 1155 is at least a part of an isolation region that isolates a collector of a respective transistor to minimize leakage current through a substrate on which the transistor is formed. In an example, the n-well isolation structure is a deep n-well isolation structure (DNW). Using a deep n-well structure improves sensor accuracy by reducing leakage current.

During operation, a current flows through the single branch 1105. As described with reference to FIG. 11, the respective $V_{BE}$ for each of the first diode-connected PNP BJT 1130 and the second diode-connected PNP BJT 1135 varies with temperature. The temperature-dependent voltage measured by the voltage sensor 1150 between the node 1140 and the second power supply ($V_{SS}$) 1115 is according to Equation Ten:

$$\text{Voltage} = V_{BEQ1} - V_{BEQ2} = \frac{kT}{q}\ln\left(\frac{M1}{M2}\right) \quad \text{Equation Ten}$$

Where, in Equation Ten:
Voltage=voltage measured by the voltage sensor 1150
$V_{BEQ1}=V_{BE}$ of the first diode-connected PNP BJT 1130 at a specific absolute temperature
$V_{BEQ2}=V_{BE}$ of the second diode-connected PNP BJT 1135 at the specific absolute temperature Further, $\Delta V_{BE}$ can be determined by Equation Eleven:

$$\Delta V_{BE} = \left(\frac{KT}{Q}\right) * \ln\left(\frac{I_{C1}}{I_{C2}}\right) \quad \text{Equation Eleven}$$

Where, in Equation Eleven:

$$\left(\frac{I_{C1}}{I_{C2}}\right) = (M1/M2)$$

$$\Delta V_{BE} = 2V1 - V2 - V0$$

$$\text{Total Current} = \frac{Vdd - V2}{R} = M1 * I_{C1} = M2 * I_{C2}$$

$I_{C1}$=the total current through the first diode-connected NPN BJT 1030 divided by the multiplier M1
$I_{C2}$=the total current through the second diode-connected NPN BJT 1035 divided by the multiplier M2
$I_{C1}$ and $I_{C2}$ are unit currents through a single transistor without a multiplier.

Figure 12A:
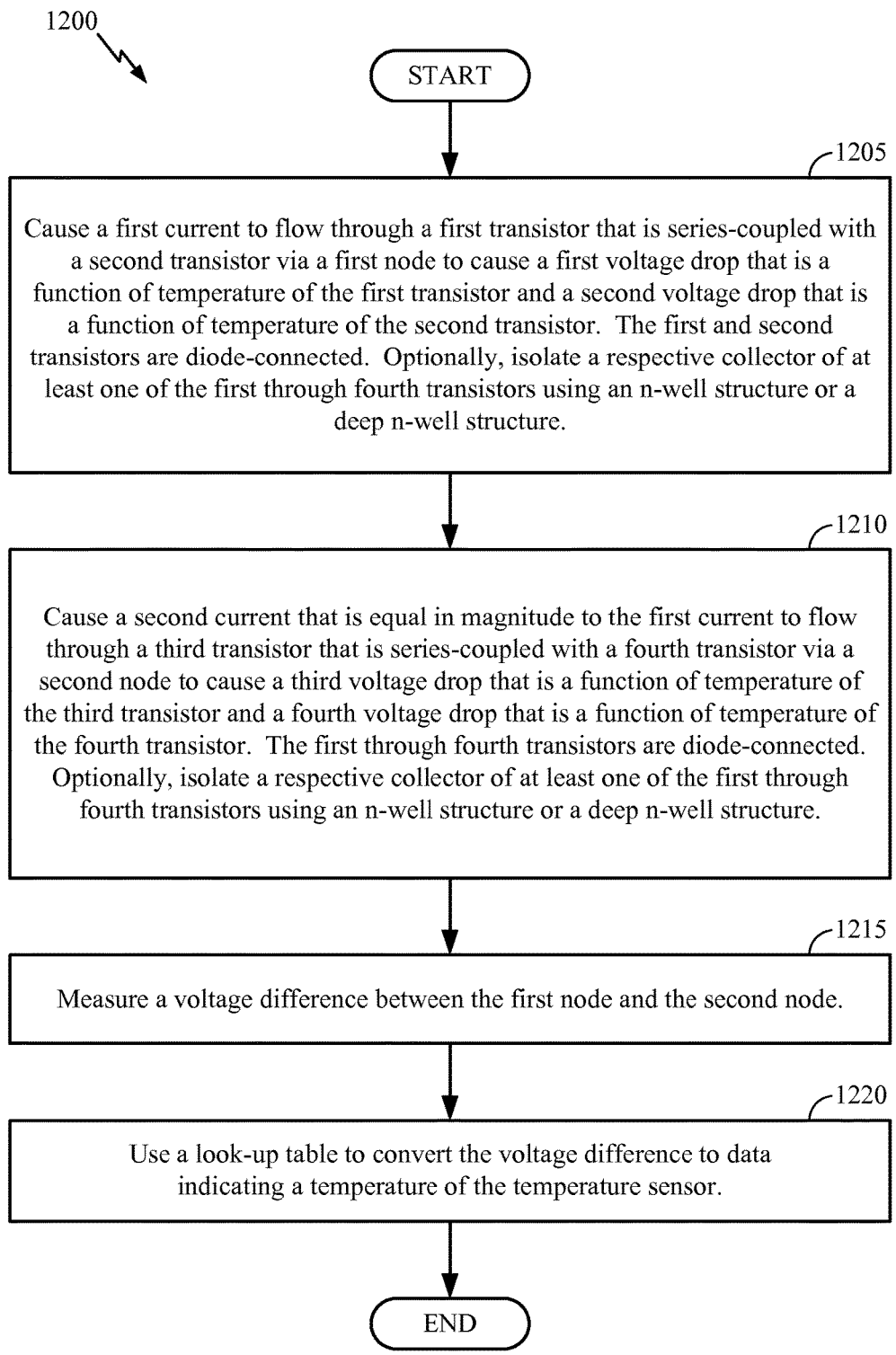
FIGS. 12A-12B depict a flowcharts of exemplary methods for measuring temperature.

FIG. 12A depicts a flowchart of an exemplary method for measuring temperature 1200. The method for measuring temperature 1200 can be performed by the apparatus described hereby.

In block 1205, a first current is caused to flow through a first transistor that is series-coupled with a second transistor via a first node to cause a first voltage drop that is a function of temperature of the first transistor and a second voltage drop that is a function of temperature of the second transistor. The first and second transistors are diode-connected. Optionally, an n-well structure or a deep n-well structure can be used to isolate a respective collector of at least one of the first through fourth transistors.

In block 1210, a second current that is equal in magnitude to the first current is caused to flow through a third transistor that is series-coupled with a fourth transistor via a second node to cause a third voltage drop that is a function of temperature of the third transistor and a fourth voltage drop that is a function of temperature of the fourth transistor. The first through fourth transistors are diode-connected. Optionally, an n-well structure or a deep n-well structure can be used to isolate a respective collector of at least one of the first through fourth transistors. Optionally, a fifth voltage drop can be developed across a first number "M1" of diode-connected transistors coupled in parallel between the third transistor and the second node. The fifth voltage drop is a function of temperature of the first number "M1" of diode-connected transistors. Further, a sixth voltage drop can be developed across a second number "M2" of diode-connected transistors coupled in parallel between the first node and the second transistor. The sixth voltage drop is a function of temperature of the second number "M2" of diode-connected transistors.

Optionally, the magnitude of the first current can be matched with the magnitude of the second current by causing a matching current to flow via at least one of: (1) a first resistor coupled between the power supply and, via a third node, the first transistor, (2) a second power supply coupled to the third node, (3) a second resistor coupled between the power supply and, via a fourth node, the first transistor, or (4) a third power supply coupled to the fourth node.

In block 1215, a voltage difference between the first node and the second node is measured.

In block 1220, a look-up table is used to convert the voltage difference to data indicating a temperature of the temperature sensor.

The foregoing steps are not limiting of the various examples. The steps can be combined and/or the order can be rearranged.

Figure 12B:
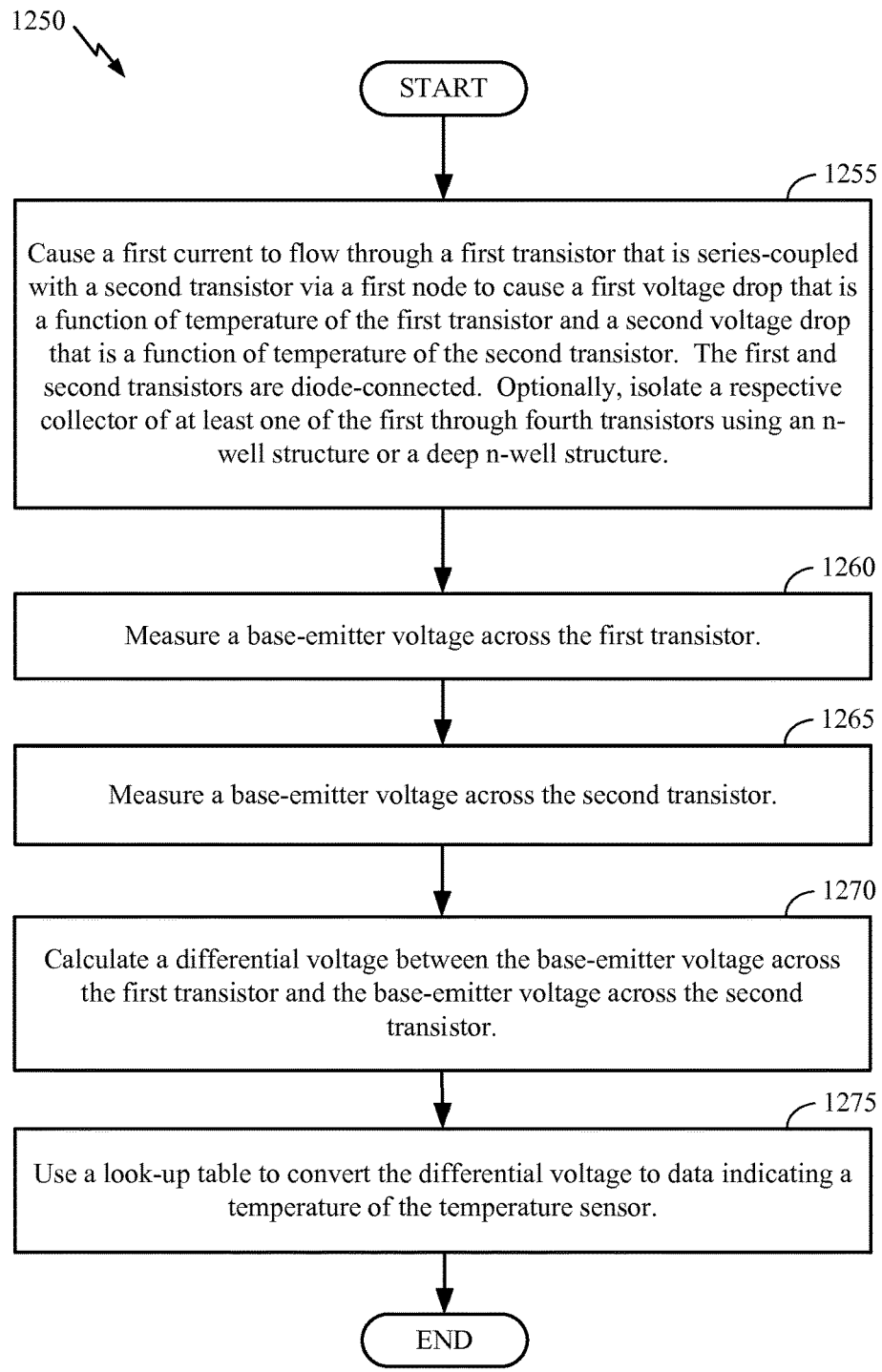

FIG. 12B depicts a flowchart of an exemplary method for measuring temperature 1250. The method for measuring temperature 1250 can be performed by the apparatus described hereby.

In block 1255, a first current is caused to flow through a first transistor that is series-coupled with a second transistor via a first node to cause a first voltage drop that is a function of temperature of the first transistor and a second voltage drop that is a function of temperature of the second transistor. The first and second transistors are diode-connected. Optionally, an n-well structure or a deep n-well structure can be used to isolate a respective collector of at least one of the first through fourth transistors.

In block 1260, a base-emitter voltage across the first transistor is measured.

In block 1265, a base-emitter voltage across the second transistor is measured.

In block 1270, a differential voltage between the base-emitter voltage across the first transistor and the base-emitter voltage across the second transistor is calculated.

In block 1275, a look-up table is used to convert the differential voltage to data indicating a temperature of the temperature sensor.

The foregoing steps are not limiting of the various examples. The steps can be combined and/or the order can be rearranged.

Further, those of skill in the art will appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The disclosed devices and methods can be designed and can be configured into a computer-executable file that is in a Graphic Database System Two (GDSII) compatible format, an Open Artwork System Interchange Standard (OASIS) compatible format, and/or a GERBER (e.g., RS-274D, RS-274X, etc.) compatible format, which are stored on a non-transitory (i.e., a non-transient) computer-readable media. The file can be provided to a fabrication handler who fabricates with a lithographic device, based on the file, an integrated device. Deposition of a material to form at least a portion of a structure described herein can be performed using deposition techniques such as physical vapor deposition (PVD, e.g., sputtering), plasma-enhanced chemical vapor deposition (PECVD), thermal chemical vapor deposition (thermal CVD), and/or spin-coating. Etching of a material to form at least a portion of a structure described herein can be performed using etching techniques such as plasma etching. In an example, the integrated device is on a semiconductor wafer. The semiconductor wafer can be cut into a semiconductor die and packaged into a semiconductor chip. The semiconductor chip can be employed in a device described herein (e.g., a mobile device).

Nothing stated or illustrated depicted in this application is intended to dedicate any component, step, feature, object, benefit, advantage, or equivalent to the public, regardless of whether the component, step, feature, object, benefit, advantage, or the equivalent is recited in the claims.

While this disclosure describes examples of the invention, changes and modifications could be made to the methods and apparatus described herein without departing from the scope of the invention as defined by the appended claims.

What is claimed is:

1. An apparatus for measuring temperature, comprising:
   a temperature sensor, comprising:
   a first branch coupled between a power supply and ground, wherein the first branch includes a first transistor that is series-coupled with a second transistor via a first node and has a first temperature sensor output via the first node; and
   a second branch coupled between the power supply and ground, wherein the second branch includes a third transistor that is series-coupled with a fourth transistor via a second node and has a second temperature sensor output via the second node,
   wherein the first through the fourth transistors are diode-connected; and
   a voltage sensor having an input coupled to the first temperature sensor output and the second temperature sensor output,
   wherein the temperature sensor is configured such that a first current flowing through the first branch and a second current flowing through the second branch have substantially equal magnitudes, and
   wherein the temperature sensor is configured such that a difference in voltage between the first temperature sensor output and the second temperature sensor output is proportional to an absolute temperature of the temperature sensor.

2. The apparatus of claim 1, wherein the voltage sensor includes a look-up table and is configured to convert the difference in voltage between the first temperature sensor output and the second temperature sensor output to data indicating the temperature of the temperature sensor.

3. The apparatus of claim 1, further comprising:
   a first resistor coupled between the power supply and, via a third node, the first transistor;
   a second power supply coupled to the third node;
   a second resistor coupled between the power supply and, via a fourth node, the third transistor; and
   a third power supply coupled to the fourth node.

4. The apparatus of claim 1, wherein at least one of the first through the fourth transistors includes an n-well or a deep n-well.

5. The apparatus of claim 1, further comprising:
   a first number M1 of diode-connected transistors coupled in parallel between the first transistor and the first node; and
   a second number M2 of diode-connected transistors coupled in parallel between the second node and the fourth transistor.

6. The apparatus of claim 1, further comprising:
   a first number M1 of diode-connected transistors coupled in parallel between the third transistor and the second node; and
   a second number M2 of diode-connected transistors coupled in parallel between the first node and the second transistor.

7. The apparatus of claim 1, wherein at least a part of the temperature sensor is integrated on a semiconductor die.

8. The apparatus of claim 1, further comprising at least one of a mobile device, a base station, a terminal, a set top box, a music player, a video player, an entertainment unit, a navigation device, a communications device, a silicon chip, an integrated circuit, or a computer, of which the temperature sensor is a constituent part.

9. A method for measuring temperature with a temperature sensor, comprising:
   causing a first current to flow through a first transistor that is series-coupled with a second transistor via a first node to cause a first voltage drop that is a function of a temperature of the first transistor and a second voltage drop that is a function of a temperature of the second transistor;
   causing a second current that is substantially equal in magnitude to the first current to flow through a third transistor that is series-coupled with a fourth transistor via a second node to cause a third voltage drop that is a function of a temperature of the third transistor and a fourth voltage drop that is a function of a temperature of the fourth transistor, wherein the first through the fourth transistors are diode-connected; and
   measuring a voltage difference between the first node and the second node, wherein the voltage difference between the first node and the second node is proportional to an absolute temperature of the temperature sensor.

10. The method of claim 9, further comprising using a look-up table to convert the voltage difference to data indicating the temperature of the temperature sensor.

11. The method of claim 9, further comprising substantially matching the magnitude of the first current with the magnitude of the second current by causing a matching current to flow via at least one of:
    a first resistor coupled between a power supply and, via a third node, the first transistor;
    a second power supply coupled to the third node;
    a second resistor coupled between the power supply and, via a fourth node, the third transistor; or
    a third power supply coupled to the fourth node.

12. The method of claim 9, further comprising using an n-well structure or a deep n-well structure to isolate a respective collector of at least one of the first through the fourth transistors.

13. The method of claim 9, further comprising:
    developing a fifth voltage drop across a first number M1 of diode-connected transistors coupled in parallel between the first transistor and the first node, wherein the fifth voltage drop is a function of a temperature of the first number M1 of diode-connected transistors; and
    developing a sixth voltage drop across a second number M2 of diode-connected transistors coupled in parallel between the second node and the fourth transistor, wherein the sixth voltage drop is a function of a temperature of the second number M2 of diode-connected transistors.

14. The method of claim 9, further comprising:
    developing a fifth voltage drop across a first number M1 of diode-connected transistors coupled in parallel between the third transistor and the second node, wherein the fifth voltage drop is a function of a temperature of the first number M1 of diode-connected transistors; and developing a sixth voltage drop across a second number M2 of diode-connected transistors coupled in parallel between the first node and the second transistor, wherein the sixth voltage drop is a function of a temperature of the second number M2 of diode-connected transistors.

15. An apparatus configured to measure temperature, comprising:

means for causing a first current to flow through a first transistor that is series-coupled with a second transistor via a first node to cause a first voltage drop that is a function of a temperature of the first transistor and a second voltage drop that is a function of a temperature of the second transistor;

means for causing a second current that is substantially equal in magnitude to the first current to flow through a third transistor that is series-coupled with a fourth transistor via a second node to cause a third voltage drop that is a function of a temperature of the third transistor and a fourth voltage drop that is a function of a temperature of the fourth transistor, wherein the first through the fourth transistors are diode-connected; and means for measuring a voltage difference between the first node and the second node, wherein the voltage difference between the first node and the second node is proportional to an absolute temperature of the temperature sensor.

16. The apparatus of claim 15, further comprising means for using a look-up table to convert the voltage difference to data indicating the temperature of the apparatus.

17. The apparatus of claim 15, further comprising means for substantially matching the magnitude of the first current with the magnitude of the second current by causing a matching current to flow via at least one of:

a first resistor coupled between a power supply and, via a third node, the first transistor;

a second power supply coupled to the third node;

a second resistor coupled between the power supply and, via a fourth node, the third transistor; or a third power supply coupled to the fourth node.

18. The apparatus of claim 15, further comprising means for using an n-well structure or a deep n-well structure to isolate a respective collector of at least one of the first through the fourth transistors.

19. The apparatus of claim 15, further comprising:

means for developing a fifth voltage drop across a first number M1 of diode-connected transistors coupled in parallel between the first transistor and the first node, wherein the fifth voltage drop is a function of a temperature of the first number M1 of diode-connected transistors; and means for developing a sixth voltage drop across a second number M2 of diode-connected transistors coupled in parallel between the second node and the fourth transistor, wherein the sixth voltage drop is a function of a temperature of the second number M2 of diode-connected transistors.

20. The apparatus of claim 15, further comprising:

means for developing a fifth voltage drop across a first number M1 of diode-connected transistors coupled in parallel between the third transistor and the second node, wherein the fifth voltage drop is a function of a temperature of the first number M1 of diode-connected transistors; and means for developing a sixth voltage drop across a second number M2 of diode-connected transistors coupled in parallel between the first node and the second transistor, wherein the sixth voltage drop is a function of a temperature of the second number M2 of diode-connected transistors.

21. The apparatus of claim 15, wherein at least a part of the means for causing the first current to flow is integrated on a semiconductor die.

22. The apparatus of claim 15, further comprising at least one of a mobile device, a base station, a terminal, a set top box, a music player, a video player, an entertainment unit, a navigation device, a communications device, a silicon chip, an integrated circuit, or a computer, of which the means for causing the first current to flow is a constituent part.

23. The apparatus of claim 1, wherein the first transistor comprises a first number M1 of first diode-connected transistors coupled in parallel between the power supply and the first node, and wherein the fourth transistor comprises the first number M1 of fourth diode-connected transistors coupled in parallel between the second node and ground.

24. The apparatus of claim 1, wherein the third transistor comprises a second number M2 of third diode-connected transistors coupled in parallel between the power supply and the second node, and wherein the second transistor comprises the second number M2 of second diode-connected transistors coupled in parallel between the first node and ground.

25. The method of claim 9, wherein the first transistor comprises a first number M1 of first diode-connected transistors coupled in parallel between a power supply and the first node such that the first voltage drop is a function of a temperature of the first diode-connected transistors, and wherein the fourth transistor comprises the first number M1 of fourth diode-connected transistors coupled in parallel between the second node and ground such that the fourth voltage drop is a function of a temperature of the fourth diode-connected transistors.

26. The method of claim 9, the third transistor to comprise a second number M2 of third diode-connected transistors coupled in parallel between a power supply and the second node such that the third voltage drop is a function of a temperature of the third diode-connected transistors; and the second transistor to comprise the second number M2 of second diode-connected transistors coupled in parallel between the first node and ground such that the second voltage drop is a function of a temperature of the second diode-connected transistors.

27. The apparatus of claim 15, wherein the first transistor comprises a first number M1 of first diode-connected transistors coupled in parallel between a power supply and the first node such that the first voltage drop is a function of a temperature of the first diode-connected transistors, and wherein the fourth transistor comprises the first number M1 of fourth diode-connected transistors coupled in parallel between the second node and ground such that the fourth voltage drop is a function of a temperature of the fourth diode-connected transistors.

28. The apparatus of claim 15, further comprising:

the third transistor to comprise a second number M2 of third diode-connected transistors coupled in parallel between a power supply and the second node such that the third voltage drop is a function of a temperature of the third diode-connected transistors; and the second transistor to comprise the second number M2 of second diode-connected transistors coupled in parallel between the first node and ground such that the second voltage drop is a function of a temperature of the second diode-connected transistors.

29. An apparatus for measuring temperature, comprising:
a temperature sensor, comprising:
   a first branch coupled between a first power supply and a second power supply, the first branch comprising a first transistor series-coupled with a second transistor via a first node, the first transistor being between the first power supply and the first node, and the second transistor being between the first node and the second power supply; and
   a second branch coupled between the first power supply and the second power supply, the second branch comprising a third transistor series-coupled with a fourth transistor via a second node, the third transistor being between the first power supply and the second node, and the fourth transistor being between the second node and the second power supply,
a voltage sensor having inputs coupled to the first node and the second node, the voltage sensor configured to measure a voltage difference and output data indicating a temperature of the temperature sensor based on the voltage difference,
wherein the second and the fourth transistors are diode connected,
wherein the voltage difference is a difference between a first node voltage and a second node voltage, the first node voltage being a voltage at the first node and the second node voltage being a voltage at the second node, and
wherein the temperature sensor is configured such that
   a first current flowing through the first branch and a second current flowing through the second branch have substantially equal magnitudes, and
   the voltage difference is proportional to an absolute temperature of the temperature sensor.

30. The apparatus of claim 29, wherein the first and the third transistors are diode connected.

31. The apparatus of claim 30,
wherein the first transistor comprises M1 first diode-connected transistors coupled in parallel between the first power supply and the first node,
wherein the second transistor comprises M2 second diode-connected transistors coupled in parallel between the first node and the second power supply,
wherein the third transistor comprises M2 third diode-connected transistors coupled in parallel between the first power supply and the second node,
wherein the fourth transistor comprises M1 fourth diode-connected transistors coupled in parallel between the second node and the second power supply, and
wherein M1 and M2 are integers ≥1 and M1≠M2.

32. The apparatus of claim 29,
wherein the first and the third transistors are not diode connected,
wherein an emitter of the first transistor is coupled to the first power supply and a base of the first transistor is coupled to the first node, and
wherein an emitter of the third transistor is coupled to the first power supply and a base of the third transistor is coupled to the second node.

33. The apparatus of claim 32,
wherein the first transistor comprises M1 first non-diode-connected transistors coupled in parallel between the first power supply and the first node,
wherein the second transistor comprises M2 second diode-connected transistors coupled in parallel between the first node and the second power supply,
wherein the third transistor comprises M2 third non-diode-connected transistors coupled in parallel between the first power supply and the second node,
wherein the fourth transistor comprises M1 fourth diode-connected transistors coupled in parallel between the second node and the second power supply, and
wherein M1 and M2 are integers ≥1 and M1≠M2.

34. The apparatus of claim 29, further comprising:
a first resistor coupled between the first power supply and the first transistor via a third node;
a third power supply coupled to the third node;
a second resistor coupled between the first power supply and the third transistor via a fourth node; and
a third power supply coupled to the fourth node.

35. The apparatus of claim 34, wherein the first and the third transistors are diode connected.

36. The apparatus of claim 35,
wherein the first transistor comprises M1 first diode-connected transistors coupled in parallel between the third node and the first node,
wherein the second transistor comprises M2 second diode-connected transistors coupled in parallel between the first node and the second power supply,
wherein the third transistor comprises M2 third diode-connected transistors coupled in parallel between the fourth node and the second node,
wherein the fourth transistor comprises M1 fourth diode-connected transistors coupled in parallel between the second node and the second power supply, and
wherein M1 and M2 are integers ≥1 and M1≠M2.

37. The apparatus of claim 34,
wherein the first and the third transistors are not diode connected,
wherein an emitter of the first transistor is coupled to the third node and a base of the first transistor is coupled to the first node, and
wherein an emitter of the third transistor is coupled to the fourth node and a base of the third transistor is coupled to the second node.

38. The apparatus of claim 37,
wherein the first transistor comprises M1 first non-diode-connected transistors coupled in parallel between the third node and the first node,
wherein the second transistor comprises M2 second diode-connected transistors coupled in parallel between the first node and the second power supply,
wherein the third transistor comprises M2 third non-diode-connected transistors coupled in parallel between the fourth node and the second node,
wherein the fourth transistor comprises M1 fourth diode-connected transistors coupled in parallel between the second node and the second power supply, and
wherein M1 and M2 are integers ≥1 and M1≠M2.

* * * * *